No. 663,652. Patented Dec. 11, 1900.
C. D. W. COLBY.
GAGE FOR SHEARS.
(Application filed May 4, 1900.)
(No Model.)
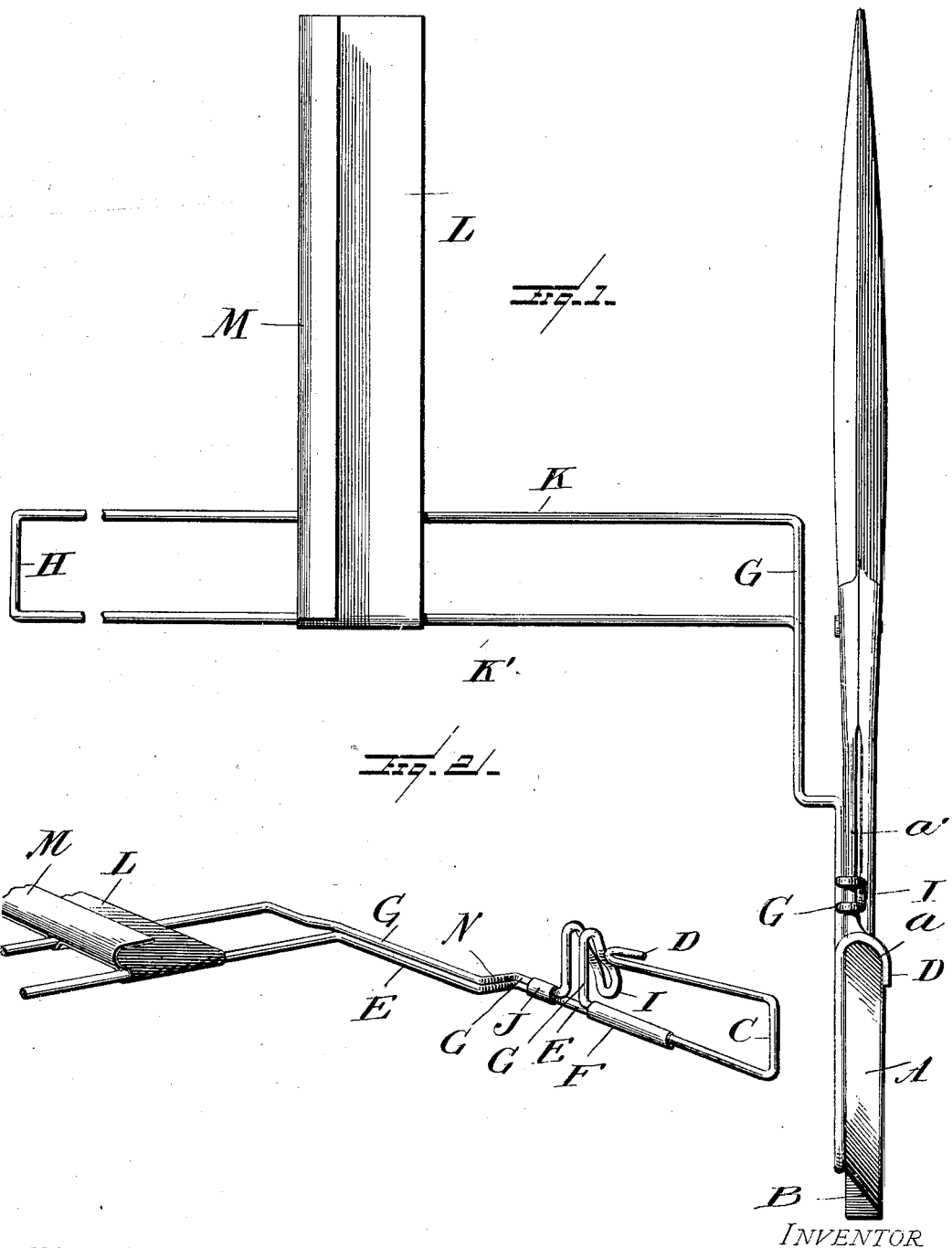
WITNESSES:
L C Hills
J. K. Moore
INVENTOR
Charles D. W. Colby
BY
Whitaker Prevost Attorneys

UNITED STATES PATENT OFFICE.

CHARLES D. W. COLBY, OF ALBION, MICHIGAN.

GAGE FOR SHEARS.

SPECIFICATION forming part of Letters Patent No. 663,652, dated December 11, 1900.

Application filed May 4, 1900. Serial No. 15,504. (No model.)

*To all whom it may concern:*

Be it known that I, CHARLES D. W. COLBY, a citizen of the United States, residing at Albion, in the county of Calhoun and State of Michigan, have invented certain new and useful Improvements in Shears-Gages; and I do hereby declare the following to be a full, clear, and exact description of the invention, such as will enable others skilled in the art to which it appertains to make and use the same.

My invention relates to improvements in shears-gages; and it consists in the novel features of construction hereinafter described, reference being had to the accompanying drawings, which illustrate one form in which I have contemplated embodying my invention, and said invention is fully disclosed in the following description and claims.

Referring to the drawings, Figure 1 shows my improved gage applied to a pair of shears. Fig. 2 is a perspective view of the attaching device and a portion of the frame.

The object of my invention is to provide an improved gage or guide to be applied to shears for cutting uniform widths of silk or other fabric.

My improved shears-gage consists of a piece of stout wire or other suitable material bent so as to form a long narrow guide-frame K K' H G. On the long sides K K' is secured the gage-plate L, of tin or other suitable material, having a bent-up edge guide M thereon. The gage-plate L, being adjustable on the long sides K K', may be moved along the same to any desired position for the purpose of cutting different widths. The continuation of the end piece G of the frame above referred to is welded to the bent portion E of the side piece K', as shown in Fig. 2, and angles are formed in the two wires, as at N, in order to prevent the blades of the shears from coming in contact with the said guide-frame.

At a suitable distance from the guide-frame the wire G is bent in the form of a clamp, as shown at I, adapted to be fastened onto the stem a' of the thumb-piece A of the shears. Sleeves J and F may be provided to encircle the welded portions of the two wires G E on either side of the clamp I, so as to prevent their being pulled apart by the strain on the clamp. The other wire E is formed into a large loop C, which substantially coincides with the thumb-piece A, and is provided on its forward end with a spring-hook D, adapted to engage the forward portion *a* of said thumb-piece.

The vertical plane of the loop C is parallel with the edge guide of the gage-plate L.

The application of my invention to a pair of shears is as follows: The clamp I engages the stem of the thumb-piece, the spring-hook D is fastened to the forward portion of said thumb-piece, and the gage-plate set at a given distance from the cutting edge equivalent to the width to be cut, when it is obvious that the said widths will be uniform throughout.

What I claim, and desire to secure by Letters Patent, is—

1. A gage for shears consisting of a gage-plate, an edge guide on said plate, a frame adapted to serve as a guide for said plate, a clamp adapted to engage the stem of the thumb-piece of the shears, a loop formed on said frame and a spring-hook provided on said loop for securing said loop to said thumb-piece.

2. A gage for shears consisting of a gage-plate, an edge guide on said plate, a frame adapted to serve as a guide for said plate, a downwardly-extending spring-clamp adapted to engage the stem of the thumb-piece of said shears, and a loop adapted to coincide with said thumb-piece and provided with a hook to engage said thumb-piece, substantially as described.

In testimony whereof I affix my signature in the presence of two witnesses.

CHARLES D. W. COLBY.

Witnesses:
LOUIS E. STEWART,
OTIS A. LEONARD.